United States Patent [19]

Buttner et al.

[11] 4,030,174

[45] June 21, 1977

[54] INSTALLATION FOR PREPARING CABLE LENGTHS FOR PLUG EXTRUSION

[75] Inventors: Karl Büttner; Jürgen Böll; Kurt Wölfel, all of Nuremberg, Germany

[73] Assignee: Kabel-und Metallwerke Gutehoffnungshutte Aktiengesellschaft, Hannover, Germany

[22] Filed: Oct. 13, 1976

[21] Appl. No.: 732,067

Related U.S. Application Data

[62] Division of Ser. No. 605,748, Aug. 18, 1975, Pat. No. 3,999,289.

[30] Foreign Application Priority Data

Aug. 22, 1974 Germany .......................... 2440264

[52] U.S. Cl. ................................ 29/33 M; 29/33 F; 29/33 P; 29/430; 29/564.2; 29/564.4

[51] Int. Cl.$^2$ ........................................ B23P 23/04

[58] Field of Search ................. 29/33 R, 33 F, 430, 29/33 K, 33 M, 33 P, 628, 203 D, 203 DT, 203 C, 206 D

[56] References Cited

UNITED STATES PATENTS

| | | | |
|---|---|---|---|
| 2,966,820 | 1/1961 | Huyett | 29/33 F X |
| 3,444,618 | 5/1969 | Sorlie | 29/206 X |
| 3,451,118 | 6/1969 | Badini et al. | 29/33 F X |

FOREIGN PATENTS OR APPLICATIONS

| | | |
|---|---|---|
| 712,753 | 7/1965 | Canada |

*Primary Examiner*—Victor A. DiPalma
*Attorney, Agent, or Firm*—Ralf H. Siegemund

[57] ABSTRACT

Cable lengths are prepared for extruding a plug at the end in that the lengths are stepwise moved through stations, in which each cable length is turned and oriented as to its leads; the lead ends are stripped, tin-plated and shaped in sequential stations followed by connecting preassembled contact prongs to the lead ends. The plug body is then extruded around the prong-lead connections. The lead orientation is electro-optically servo-controlled and the prong to lead connection is made by a funnel for threading the leads into the hollow prongs followed by squeezing the prongs to fasten the leads thereto.

11 Claims, 12 Drawing Figures

FIG. 4
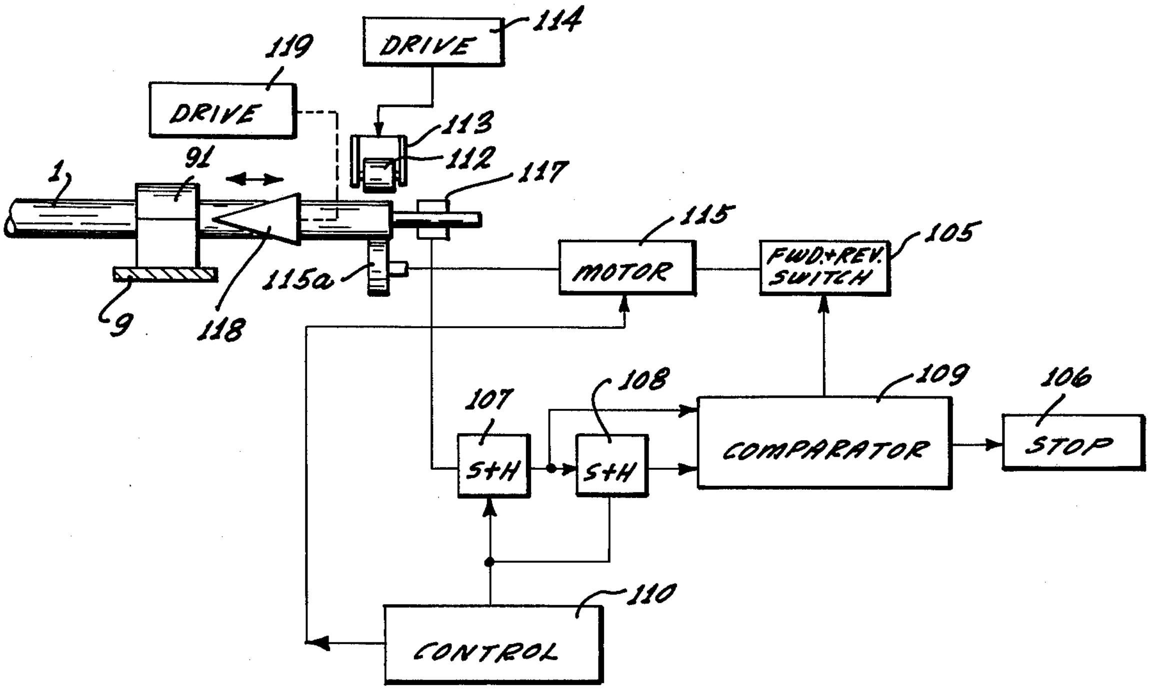
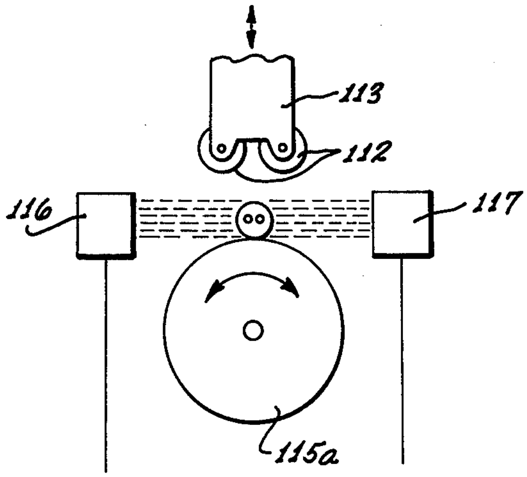
FIG. 4a

FIG. 5
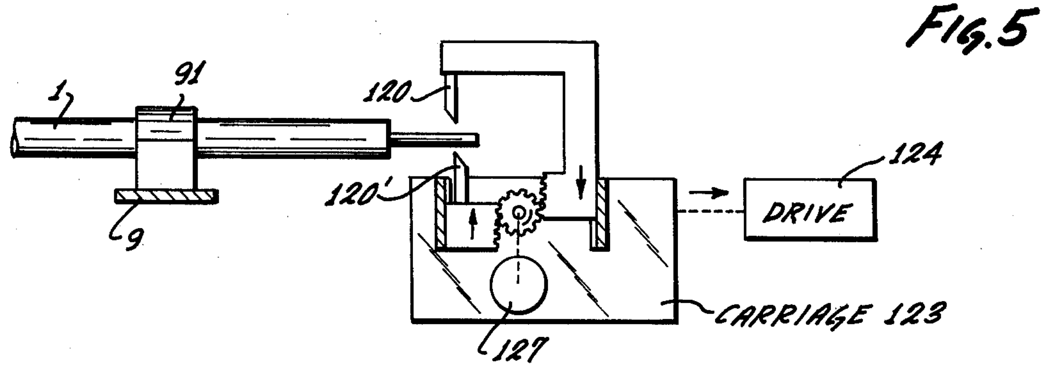
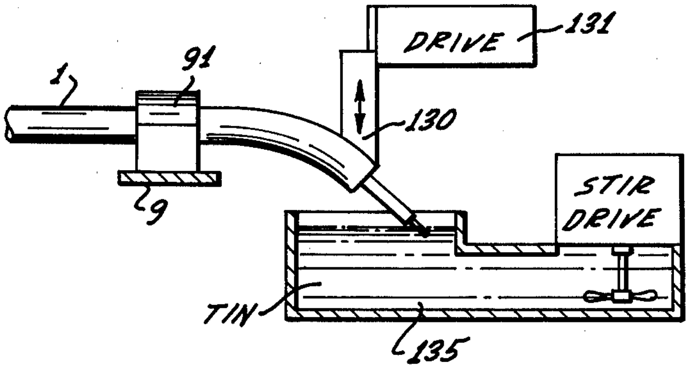
FIG. 6
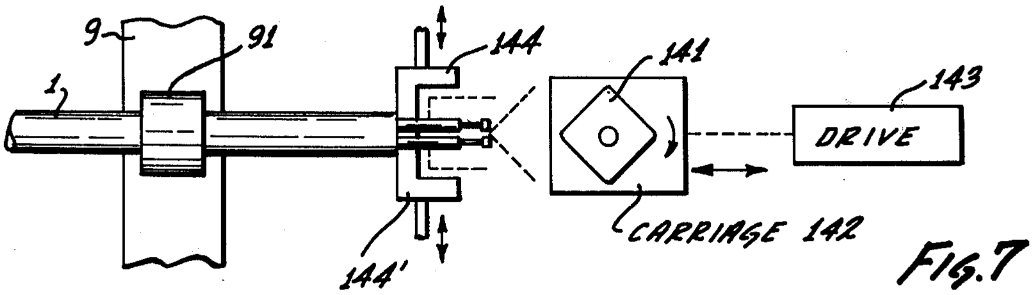
FIG. 7

INSTALLATION FOR PREPARING CABLE LENGTHS FOR PLUG EXTRUSION

This is a division of application Ser. No. 605,748, now U.S. Pat. No. 3,999,289, filed Aug. 18, 1975.

BACKGROUND OF THE INVENTION

The present invention relates to the providing of plug elements respectively to lengths of electrical conductors or cable having a plurality of leads and wherein such a plug is to have the corresponding number of pins or prongs. More particularly, the invention relates to the preparation of a cable length for extruding a plug element to one of its ends.

A plug element to be made may consist basically of an insulative holding bridge or the like supporting the contact prongs or pins, and a body embeds this holder as well as the connections between leads and pins. The equipment for making such a plug element usually includes a station in which particular lengths are sequentially cut from a long cable. Subsequently, the insulative jacket around the respective insulated leads must be removed from one end of each length as it leaves the cutter. The other end remains as is or is otherwise prepared. The prongs are connected to the lead ends and the plug is extruded at that one end of the length around the connection of leads and prongs. The resulting product is then provided to electrical manufacturers who connect the free end of the cable to the their equipment.

Prior to extrusion, but following the removal of the insulation jacket, the cable length end must be prepared additionally in that insulation must be stripped off the wire leads and their tips must be strengthened; tension relief may be included in the assembly prior to extruding the plug body around the connection.

The assembly and preparation has been heretofore rather cumbersome and was not very economical even though automation has been employed to a limited extent.

DESCRIPTION OF THE INVENTION

It is an object of the present invention to prepare lengths of cable for extruding plug bodies at their ends (one or both as the case requires).

In accordance with the preferred embodiments of the invention, it is suggested to provide for stepwise movement of the individual lengths past several stations whereby the individual lengths are preferably held in transverse, stretched configuration. In the first station, the cable is turned until the leads have a particular, straight orientation, parallel to each other. In the next station the insulation is stripped off, an end portion of the individual leads and in the next station thereafter the tips are strengthened, e.g. dip-coated. If stripping was carried out only to the extent needed to expose the tips to the coating, additional insulation stripping may be needed thereafter, because in the next station the lead ends are shaped, so that the tips have position for connection to contact prongs or pins, e.g. inserting them into tubular prongs or pins in the next station thereafter. These prongs or pings may have been preassembled in a holder. The thus treated cable is now ready for extruding a plug body about the connection between the lead ends and the contact prongs or pins.

It can thus be seen that the entire assembly can be provided for automated preparation of a cable length for extruding a plug body to one end, beginning from cutting the lengths from a long cable which is taken from a drum, up until extrusion in a final station which can but does not have to succeed directly the assembling steps and stations of the line along and in which the lengths are moved and worked in steps. Personnel is needed only in a general supervisory capacitor and, possibly, for inspecting the completed lengths with attached plugs and testing them. The lengths are not moved in separate containers from one station to the next one, except maybe to the extruder.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 4 is a somewhat schematic representation of the cable turning station;

FIG. 4*a* is a front view of the station shown in FIG. 4;

FIG. 5 is a schematic representation of the lead insulation stripping station;

FIG. 6 is a schematic representation of the tin-plating station;

FIG. 7 is a schematic representation (top view) of the lead end forming station;

Proceeding now to the detailed description of the drawings, FIG. 1 shows a two-lead conductor or cable 1 whose two leads 2 and 3 have their respective ends connected to pins or prongs 4 and 5. The prongs 4 and 5 are mounted with one end in a plstic bridge 6. An insulative body constituting the plug has been extruded basically around the connection between the leads and the prongs but covering also the adjacent end portion of the cable jacket as well as the bridge. This is the completed product which has been made by means of equipment and installations to be described in the following.

FIG. 2 shows a drum 19 for the two-lead cable 1, and that cable is paid from the drum and fed e.g. by a caterpillar capstan or the like, into and through a station in which sequentially equal lengths are cut from the cable string. The cable is presumed to have a jacket around the two leads, and station 8 is also provided for de-jacketing the ends of the lengths as cut. The station 8 is conventional and does not require elaboration. Such a station is also known as Artos machine.

Figure 1:
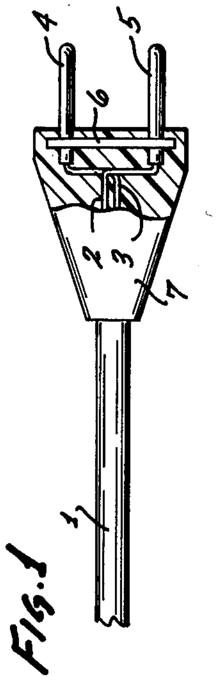
FIG. 1 is a side view, partially in longitudinal section of the plug to be made in accordance with the inventive process.

Station 8 places the cut lengths one after the other on a transport line 9 constructed e.g. as two endless belts.

These belts include holders 91 which receive the cable lenghts and hold them in a stretched position. Reference numeral 10 denotes the direction of transport movement and the cable lengths are moved sequentially through the several stations 11 through 16 for processing.

The belts 9 are driven by a drive 92 which in turn is operated by a control device 93 for stepwise advance. In the most simple pattern, the several stations are equidistantly spaced along the travel path of belts 9, and the holding devices (grippers) 91 are spaced along these belts by the same distance, so that foilowing each step of movement, a cable length is in each station and no cable length is worked. However, in the general sense, the grippers should be spaced at a particular distance from each other, so that the sequential lengths are spaced accordingly, and the respective distances from station to station should be integral multiples of that particular distance. Presently, the integer is "one" in all instances.

The step controller 93 may be operated by the belts themselves in that a scanner scans the passage of cable lengths and/or grippers at a particular location and stops the drive 92. The controller 93 may include a timer which issues clocking and timing or control pulses and in separate output lines following stopping and to be used in each station for control of the sequence of operational steps therein to be described. The step drive 92 is restarted after a number of timing pulses have issued from control 93 which is the maximum number of steps needed for any of the stations. Of course, the stations may have a greater degree of autonomie as far as control of their own operations are concerned; nevertheless, timing is needed to defer the next advancing step of conveyor 9 until the slowest working station has completed its work. The operation of the stations may be asynchronous and each may issue a completion signal, so that the conveyor 9 moves again only after all completion signals are in.

The leads 2 and 3 may be twisted and stripping the end portions of the jacket off does not untwist the exposed leads. Station 11 are provided to untwist the leads. However, even if the leads are not twisted (as shall be presumed), they have an arbitrary orientation after cutting and gripping and as they leave station 8.

Figure 3:
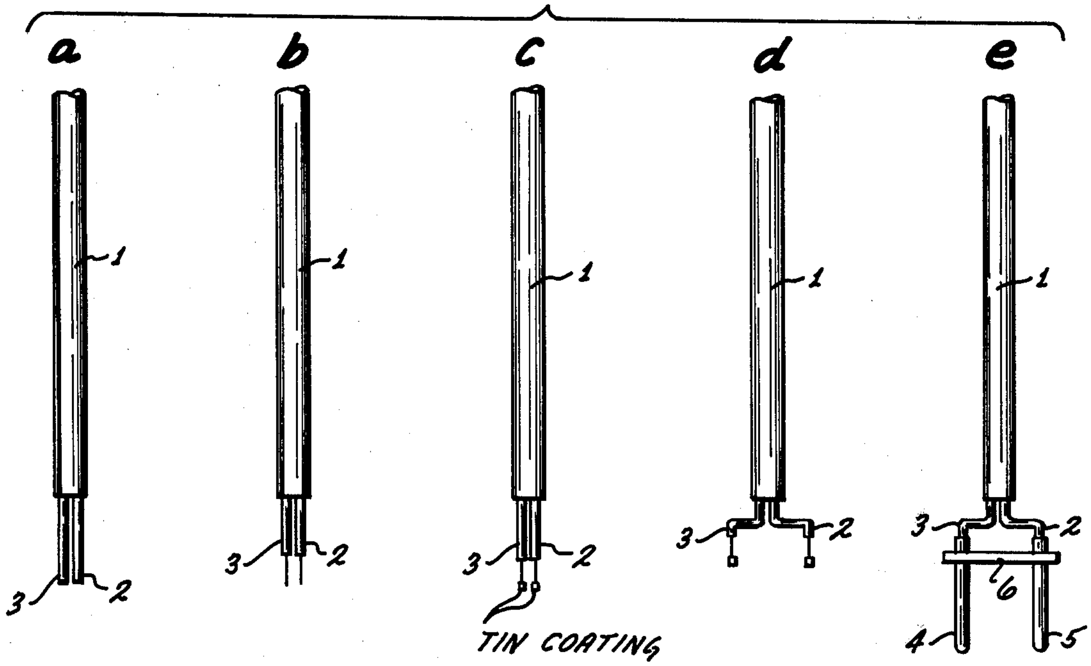
FIG. 3 shows in portions *a* through *e* the progressive preparation of a cable end for the extrusion process.

The holding brackets 91 on line 9 are opened in stations 11, and the cable ends are gripped and rotated until the leads lie parallel to each other as shown in FIG. 3*a*.

FIGS. 4 and **4*a* illustrate by way of example a station 11 and in greater detail. The cable lengths 1 arrive at the station, one at a time, while being held by grippers or brackets 91 on the belts such as 9. The transport line stops and timing control 93 takes over temporarily during stopping. A pair of rollers 112 is resiliently mounted in a holder 113 which can be moved up and down by a drive 114. These rollers 112, when being moved down, engage the cable end 1, but where insulation has not been stipped off the leads. The cable end is urged against a drum 115*a*, having a surface for frictional engagement of the cable. The drum 115*a*** is driven by a step motor which can drive in two directions.

The two leads as they arrive in station 11 have an undefined orientation. That orientation is slightly changed by the holding device **112/115*a*. As drive 114 advances insert 112, the cable as engaging drum 115*a* are oriented, but only temporarily and that orientation does not affect the leads in their entirety. The drive 114 is operated by a first timing pulse from control 93. The next timing and control signal from control 93 is applied to a drive 118 for a wedge element 119 which advances and spreads the jaws or brackets of gripper 91 to release the cable length from transport 9**.

The two stripped leads extend into the range of a light barrier comprised of a light source 116 and of a photoelectric detector 17. In the case of analog signal processing detector 117 may consist of a photo resistor, a photo diode or a photo transistor. In the case of digital process, an array of such elements may be provided to be scanned electronically.

The two leads are located in the light path between 116 and 117, shade the detector to some extent, and provide an intensity modulation accordingly. The modulated light reaches a photoelectric detector 117. The modulation thus detected, optically depends on the mutual orientation of the leads in the light path. A control circuit 110, private to station 11, responds to another timing pulse from central control 93, and begins to issue sample pulses alternating with step control pulses.

The first sample pulse reaches a sample and holds circuit 107 which is connected to detector 117. The step pulse provided thereafter causes motor 115 to move by one step, basically in an arbitrary direction, so that the cable is turned by a small angle, and the degree of shading the light path by the leads is slightly modified. The next sample path is again applied to sample and hold circuit 107 and also to a sample and hold circuit 108 receiving as an input the output of circuit 107. The latter receives now the detector signal following the modified light modulation by operation of the first turning step, and the signal level now set into circuit 108 represents the light modulation prior to that turning step by motor 115.

A comparator 109 is connected to the two circuit 107, 108 and compares the signal levels. If the later level (in 107) is higher, a reversing command does not issue, and the next motor control pulse from 110 causes the motor to move by one step in the same direction, because the cable length was and is turned in the correct direction. If the level in 107 is lower than in 108, comparator 109 issues a reversing command to a switch 105 which causes the next motor stepping pulse to be applied for operating the motor 115 in the reverse direction.

It appears from the foregoing that the motor 115 is operated to turn the cable, so that the leads shade the light path less and less, in other words, the cable with leads are turned towards a position of alignment in which one lead shades the other as that establishes minimum light obstruction and maximum light for detector 117. As the light path is horizontally oriented, this maximum light condition signifies orientation of the leads, side by side in a horizontal plane. Actually, FIG. **4*a*** depicts the orientation of the cable for this case.

After the maximum light position has been reached, the next moving step will cause the light to be reduced again, so that the output of comparator 109 signals a reversing command to switch 105. The next motor pulse causes a turning back of the cable length to the desired end position.

The reversal at this point is monitored by a separate circuit 106 which monitors occurrance of a reverse command from comparator 109, but only after the first two motor control steps have occurred, because a first reversal may have occurred initially; the circuit had to find at first the correct direction for the motor to move the leads into the desired position of horizontal alignment. Thus, circuit 106 may be delayedly enabled from control 110 and its current response is a true indication that the desired orientation for the leads has been reached.

Motor 115 is of a commercially available variety having, e.g. a stepping rate of 1 kHz at about 5 revolutions per seconds. Such a motor develops full torque immediately upon being turned on and stops instantly on current turnoff. Thus, the motor can be reversed in about 1 millisecond.

Circuit 106 when responding issues a stop command to control 110, so that no further motor stepping pulses issue. Also, drive 114 for carriage 113 is operated to retract carriage 113, so as to release the cable ends. This is followed by retraction of wedge 119, so that brackets 91 close again on the cable after the cable turning device has released the leads. The cable is now held and maintained on conveyor 9, so that the leads retain the desired position as shown in FIG. 3*a*. The rollers 112 hold the cable against the drum 115*a* in the fixed position until cable 1 is held again by the bracket.

It should be mentioned that, for example, in the case of a three lead calbe one of the leads is provided for a ground connection and must have a particular orientation with respect to the other two as well as to the ground connector prong. This particular ground wire lead will have a particular color distinct from the color of the other two lads. It should be noted that at this point the individual leads have not been stripped; only the insulation jacket enveloping both leads have been stripped.

Figure 4B:
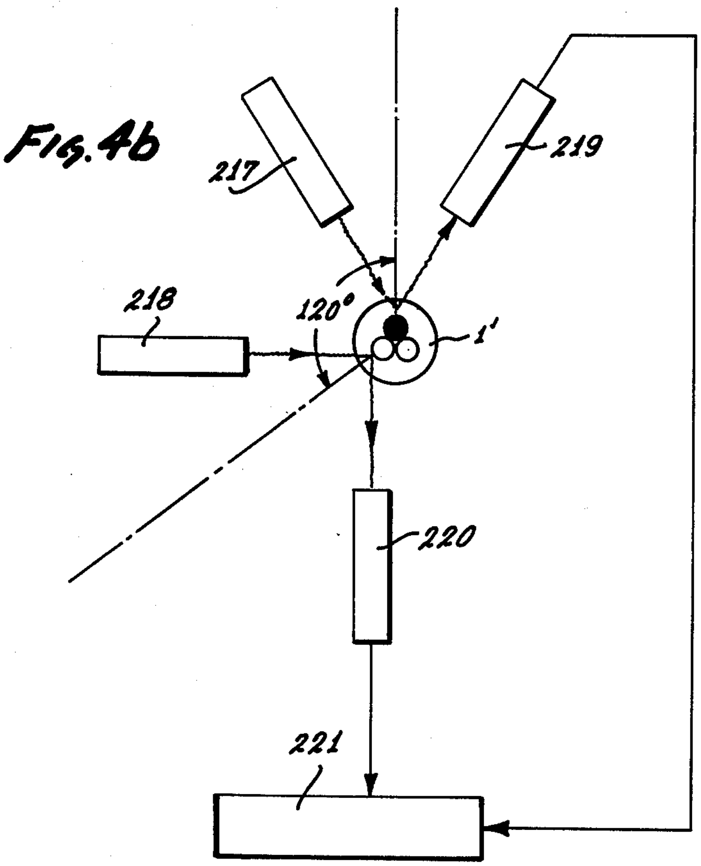
FIG. 4*b* is a schematic view of a portion of a modified turning station.

This particular ground lead is identified in FIG. 4*b* by heavy sectioning and may have yellow and green striped insulation while the two other leads are of uniform color, e.g. brown, black or blue. rather than using shading as per FIGS. 4 and 4*a*, FIG. 4*b* shows how the different reflections ar being used to orient the cable length.

Accordingly, the cable end is monitored by two measuring heads, each having a light source and a detector accordingly. Thus, one head has a source 217 and a detector 219, the other head has a light source 218 and a detector 2. The signals of these detectors are passed to electronic circuit 221 being constructed basically as described and controlling the stepping motor 115. The cable end turning means are the same (115*a*, 112) as in FIG. 4.

The two heads are oriented to each other in such a manner that the center lines between their respective receivers and sources have an angle of about 120°. One head is designed to respond particularly to the yellow-green color of the ground lead, while the other head (e.g. 118, 120) is designed to respond predominantly to the color of the other two leads.

The overall operation is just as aforedescribed, except that reflection maxima rather than minima are used as criterium when to stop further orienting. Please note that green/yellow detector 219 alone cannot ascertain the exact position of the leads because the color strips do not have a well defined position so that this detector must have a rather broad spectral range. The other detector, 220, can define a position but since there are two leads of the same color, the detector 220 may respond to two different positions under detection of maximum reflection. Thus, detector 219 is provided to resolve that ambiguity. Particularly, detector 219 must respond before detector 220, and the stop-and-reverse condition outlined above, occurs only on the basis of that sequence of response of the detectors. Whenever 220 responds before 219, the second signal lead is in the range of the former and that is an incorrect position. The electronics may include separate signal paths as far as sample and hold circuits and comparators are concerned, and the condition simply is that the comparator sets, e.g. a flip-flop for each detector channel, whereby the channel for detector 220 responds to actuate FWD and Rev. Switch 105 only when the flip-flop for the channel for detector 219 has responded earlier; otherwise the response of the detector 220 channel is ignored and the turning operation continues. The circuit and system, thus, ensures that the ground lead is, so to speak, on top, and now the plug can be affixed in that position, making sure that the signal and ground connections are correctly established in the plug connecting station.

The next station 12, also a double station strips insulation from the lead ends. Since the leads have already a particular orientation, it is merely required that stripping cutters be raised and lowered from opposite sides, strip the insulation and retract. It is not necessary that the holders 91 on belts 9 release the cable length for that operation.

FIG. 5 shows one of the stations 12 in greater detail. The cable arrives also here on transport 9 and stops when the leads are between cutters 120 and 120'. A double rack and pinion arrangement 121 driven by a reversible motor 122 causes the cutters to advance, and following engagement with the leads, a carriage 123 is retracted to the right in the drawing and by operation of a hydraulic drive 124, thereby stripping the insulation from the leads (FIG. 3*b*). After completion of this operation, rack and pinion drive 122 reverse followed by reversal of the hydraulic drive 124. The control may be provided from master control 93 as stated above, issuing stepping and control pulses and signals for the several stations, and triggering and sequencing the several drives in station 12 and the others.

The next double station 13 is provided to strengthen the wire ends, for example, by tin-coating them (FIG. 6). For this, the wire ends pass first through wetting brushes or the like, possibly prior to reaching station 13. Upon stopping at that station, a plunger 130 is advanced by a hydraulic drive 131 and engages the lead ends, so that they are then bent down and dip into a tin bath 135 constructed e.g. as swelling bath. Bending down of the lead ends offers the added advantage that after the tin coated wire ends are removed from the bath, soldering lugs will not form. Such lugs could interfere with subsequent processing.

Prior to leaving station 13, the plunger 130 retracts and the wire ends are bent back; actually, they straighten under resilient reaction. The next stations will process further only one end of each cable length. Station 14 shown in FIG. 7 in top elevation bends the leads into oppositely oriented offset configurations as shown in FIG. 3*d*. The station has a die member 141 on a carriage 142 which is advanced by a drive 143. Member 141 serves as wedge to spread the lads apart in the same plane. Subsequently, die members 144, 144' advance laterally towards the leads and member 141 is turned to form the lead ends as shown in FIG. 3*d*. The lead ends are now particularly placed into a parallel, spaced apart position with a distance which is equal to the aperture spacing of a bridge and of the prongs, so that the lead ends can be placed in a flush orientation with such prongs which is carried out in the next station, 15.

The bridges have been separately preassembled in that each bridge 6 has been provided with a pair of prongs or pins 4, 5. In station 15, these prepared bridges and prongs are connected to the tin coated wire ends of cable length that has arrived. The prongs are assumed to be tubularly hollow, with open ends at the respective end adjacent the bridge and particularly where projecting rearwardly therefrom, so that the leads can be fastened just by squeezing the hollow prongs.

Figure 8:
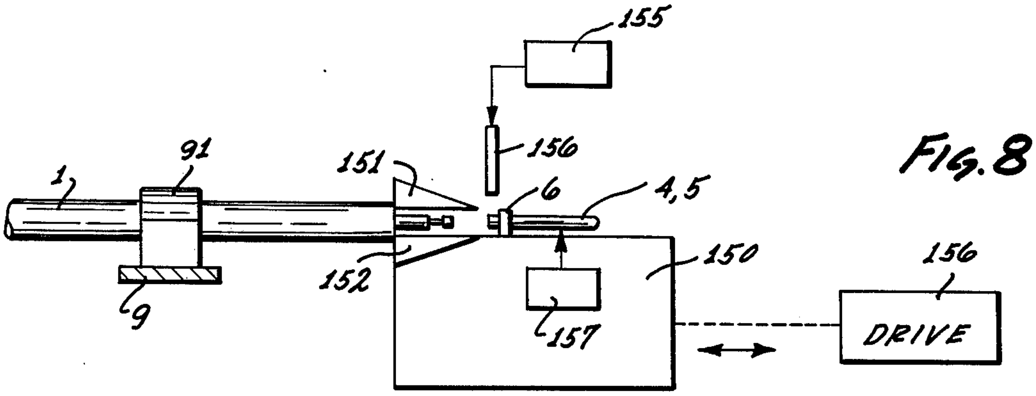
FIG. 8 is a schematic representation of the station in which contact prongs are connected to the cable lead ends.
Figure 9:
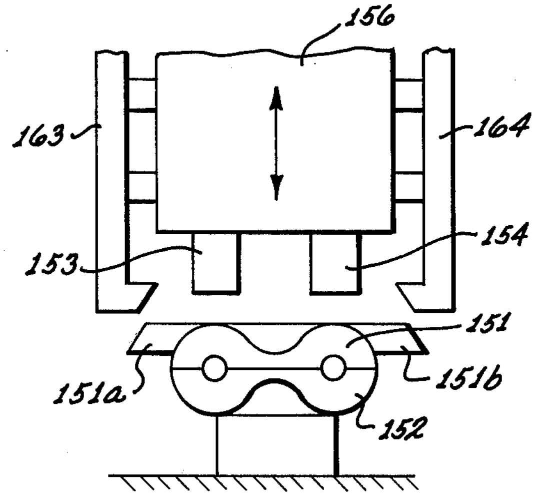
FIGS. 9 and 10 are respectively front and top views of a detail of the station shown in FIG. 8.
Figure 10:
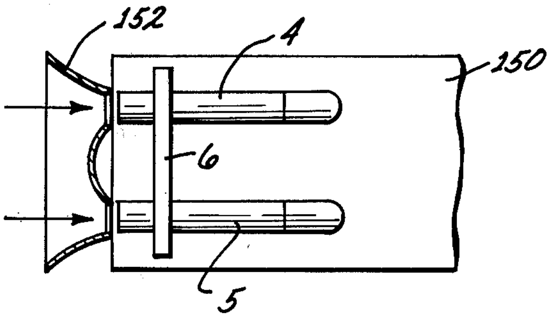

FIGS. 8, 9 and 10 show details of station 15. The station 15 has a carriage 150, which is also movable back and forth and transverse to the direction of transport of the cable lengths. A preassembled bridge with prongs is placed on the carriage (see FIG. 10) in preparation for the step of connecting the prongs with the wire leads of the respective next length which will arrive in station 15. Carriage 150 has, preferably, a contoured bed, so that the bridge with prongs have a definite position therein.

The carriage 150 is provided additionally with two halves of a longitudinally biparted guide funnel 151, 152, of which the upper part is upwardly retractable. The funnel is biparted in the horizontal plane so that plug parts can be moved into and out of the funnel when its members are separated. For the sake of clarity, funnel members 151, 152, are shown in FIG. 8 with the former in slightly lifted disposition, but in reality they rest on each other. A pair of flat (transverse to the drawing) plungers or punches 153, 154, is provided on a punch carrier 156, which is moved respectively up and down by a drive mechanism 155 which may be similar to device 121, but yields greater power. These punches serve for flattening the pins 4 and 5 when the leads have been inserted as will be described later.

The punch carrier 156 carries additionally grippers 163 and 164 which can be folded out resiliently, and lodge themselves behind lugs 151*a*, 151*b* of upper funnel 151, provided the plunger 156 is down. This way, funnel member 151 will be carried along upon upwards retraction of punches 153, 154.

In operation, the cable length with leads configured as shown in FIG. 3*d* stops in a position of alignment with carriage 150. The funnel is closed, a bridge with hollow prongs has been placed on the carriage 150. The carriage 150 advances to the left by operation of a hydraulic drive 156, whereby the wire leads are guided by the funnel as indicated by the arrows in FIG. 10. The leads are threaded into the hollow ends of the prongs 4 and 5. It should be noted that the funnel is somewhat exaggerated in the drawing of FIG. 8. The next step following insertion of the leads into the prongs and stopping of the carriage 150 is the advance of press tools-plungers 153, 154, to squeeze the hollow prongs locally for clamping of the inserted wire leads. The carriage serves as anvil here.

Following the completion of mechanically connecting the cable leads with the contract prongs, tools 153 and 154 are retracted by 155, whereby the grippers 163, 164, hold onto the lugs 151*a*, 151*b*, and upon upward movement of punch carrier 156, the upper funnel half 151 is carried along. An ejector 157 in carriage 150 may lift the contact prongs and bridge slightly off the bed on carriage 150, so that the projecting lead ends clear also the lower funnel half 152. As the transport 9 resumes its advance, the length 1 with connected contact prongs leave station 15. The carriage 150 is now retracted to receive another prong-bridge subassembly. The upper funnel 151 will drop back as the grippers 163, 164, are, for example, electromagnetically retracted. The station is now ready for another length to be provided with a plug.

As the length of cable leaves station 15, its one end is configured as depicted in FIG. 3*e*. However, station 15 may additionally include a gripper, which grips the bridge and turns it by 180°, so that the leads cross over, as one can see by comparing FIG. 1 with FIG. 3*e*. Additionally, the leads 2 and 3 have a 90° curvature relative to the pins 4 and 5.

Station 16 provides for the extrusion of the plug element around the conductor and carrying the prongs with bridge. The bridge and a portion of the cable which was not stopped becomes fully embedded in the plastic body that is being extruded and, of course, the lead-to-prong connction is fully covered and arrested in its position. The extrusion station 16 is conventional.

The now completed length 18 with plug is released by the conveyor 9 and drops into a container 17. Each step brings one cable length to that point.

Figure 2:
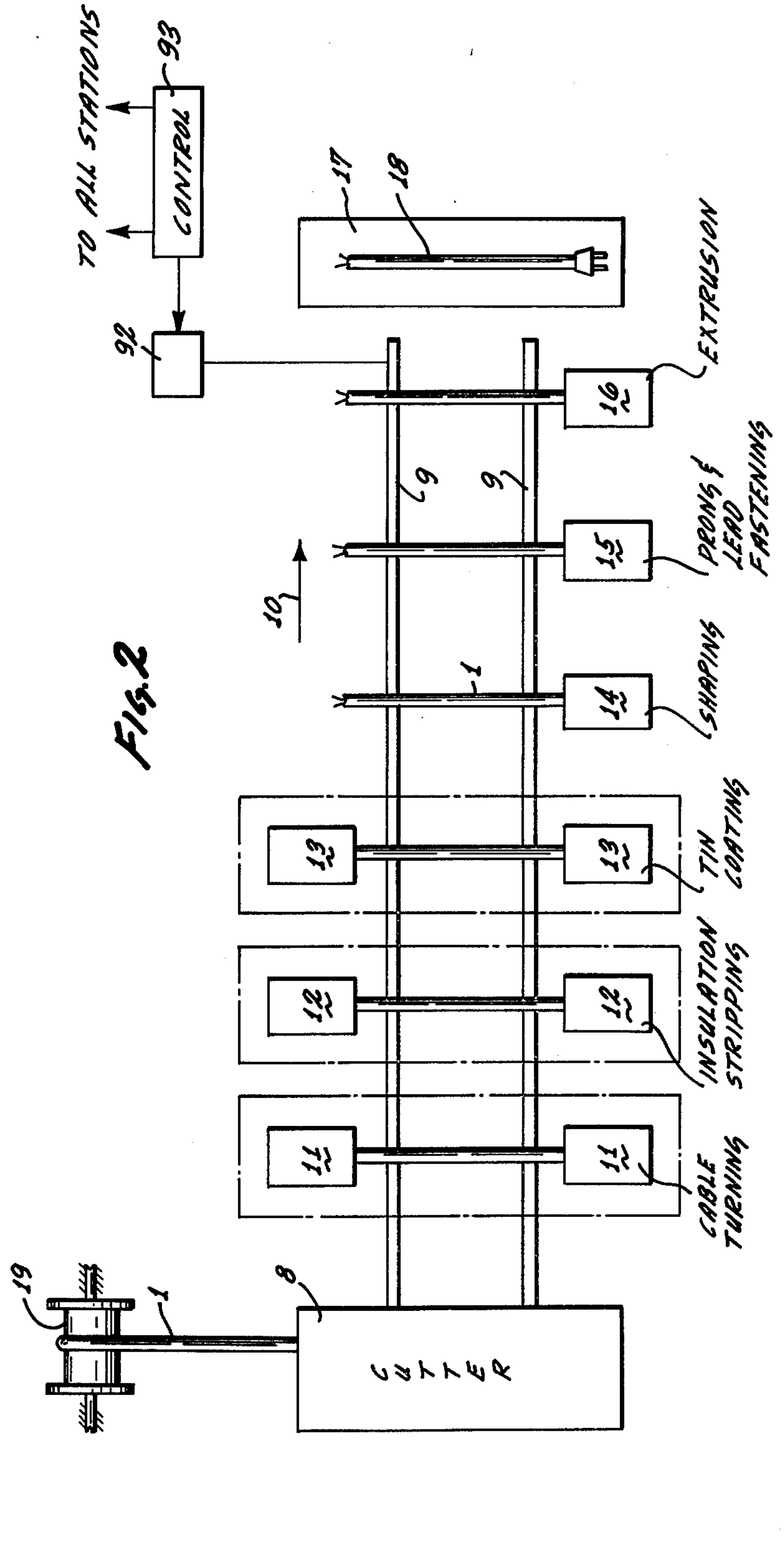
FIG. 2 is a schematic plan view of equipment in accordance with the preferred embodiment for carrying out that process.

The system as illustrated may be supplemented as follows. The specific station 12 illustrated in FIG. 2 may strip insulation only to the exact extent length of the wire later provided with tin coating. Following tin coating, i.e. after station 13, one may place another insulation stripping station, quite similar to station 12, but with a relative disposition of the stripping cutters, to remove more insulation, i.e. to bare a portion of the leads beyond the tin coated tips. This way the length of the wire end that is being strengthened is more accurately defined as the tin coating can extend only to the end of the first stripping. On the other hand, a certain portion of uncoated, bare wire is needed for a large area of contact making between wire and prongs, which is the reason for the second stripping station in that instant.

The apparatus of this invention has been explained abovwe with respect to a two lead cable. However, three or more lead cables may well be provided with a plug in accordance with the same method. Of course, the leads will then not simply be placed into one plane as per station 11, but must assume a position in which e.g. three wires forming a triangle may be necessary, as was outlined above. In particular, the conductor which will become the ground conductor should be oriented above the three others which may have side by side position as shown in FIG. 3*b*. Exact poitioning is particularly necessary to avoid damage to the wires by the insulation strippers. Otherwise the method is analogous to the one described.

In accordance with another modification stations 14 and 15 could be combined. In other words, shaping the lead ends and attaching the contact prongs could be carried out in one station.

The salient features of the invention are carried out in stations 11 through 15, which amounts to a particular sequence of preparatory steps preceding the extrusion of the plug body. Actually, that extrusion could be carried out later and elsewhere. Thus, the specific sequence could be terminated with station 15, from which the cable lengths drop into basket 17. Such an arrangement would be of specific interest if existing extrusion machines are to be used, but they do not fit into the automatic assembly line as outlined above. On the other hand, a testing station may be added to test adequacy of contact making and to remove any faulty unit. Moreover, visual inspection was found to be quite adequate.

The stations 14, 15 and 16 are placed only to one side of conveyor facility 9. However, the other ends of the cable lengths can be provided with receiver plugs, using analog stations to fasten female contacts to the leads.

The invention is not limited to the embodiments described above, but all changes and modifications thereof not constituting departures from the spirit and scope of the invention are intended to be included.

We claim:

1. In an apparatus for providing a plug element by means of extrusion to the end of a length of electrical cable having a plurality of leads and wherein each such length has to be prepared prior to extruding said element, and wherein a portion of each length, at least at one end, has its jacket removed to expose the insulated leads for a certain length, comprising:

means for positioning the lengths of cable in particular, spaced apart positions and moving the lengths in steps through a plurality of stations, said stations including:

means (a) for turning the exposed leads at least at one end of a length, so that the leads assume a predetermined orientation for and during the continuation of moving the length to the next and other stations;

means (b) for stripping the insulation of a portion of the leads as oriented to expose the wire;

means (c) for strengthening the tips of the exposed wires;

means (d) for shaping the lead ends with exposed and strengthened wire to assume an orientation and a disposition flush with the position of prongs in the completed product; and means (e) for connecting the prongs to said wires.

2. In an apparatus as in claim 1, wherein the means (c) for strengthening dip said leads to coat the bared leads at least at their tips.

3. In an apparatus as in claim 1, including means for optically detecting the extent of misalignment of the leads and means for stopping the turning as provided by the means (a) upon detecting that the leads extend parallel to each other and in a particular plane.

4. An installation for preparing cable lengths for receiving a plug as an extruded body, the lengths having been cut from long cable and the insulation jacket enveloping the plural leads in the cable having been removed from at least one end of a length, comprising:

conveyor means for holding the lengths in spaced apart disposition and transversely to a direction of movement of the conveyor means;

drive means for moving the conveyor means in predetermined steps:

a plurality of processing stations disposed along the conveyor means and having disposition so that a length of the lengths is positioned at each station in-between moving steps as provided by the drive means; and the stations including a first station for turning the leads from which the jacket has been removed until they have a particular orientation;

a second station for stripping insulation of the leads;

a third station for strengthening tips of the leads;

and at least one more station for connecting the tips to prongs as mounted in a bridge.

5. An installation as in claim 4, wherein said last mentioned station includes means for preparing the orientation of the leads, so that the tips are flush with said prongs.

6. An installation as in claim 4, wherein said last mentioned station is preceded by a station, following the third station, for preparing the orientation of the leads, so that the tips are flush with said prongs.

7. An installation as in claim 4, wherein the first station includes optical means responsive to optical properties of the leads for determining the existing orientation of the leads and means for turning the cable until the leads have the said particular orientation.

8. An installation as in claim 7, wherein the first station includes means for stepwise turning the cable lengths, the latter having been released temporarily by the holding means on the conveyor means.

9. An installation as in claim 7, wherein the optical detector means includes means for distinguishing color of the leads to ascertain the desired orientation.

10. An installation as in claim 4, wherein the last mentioned station includes a biparted funnel, and means for retracting the parts of the funnel from each other, the assembled funnel providing for threading of the leads into the prongs.

11. An installation as in claim 10, wherein one funnel part is disposed on a retractable carriage, the other funnel part being up and down movable.

* * * * *